(12) United States Patent
Bhanage et al.

(10) Patent No.: US 12,294,930 B2
(45) Date of Patent: *May 6, 2025

(54) DYNAMIC RADIO CONFIGURATION FOR SEAMLESS BACKHAUL FREQUENCY OPTIMIZATION

(71) Applicant: Cisco Technology, Inc., San Jose, CA (US)

(72) Inventors: Gautam D. Bhanage, Milpitas, CA (US); Vishal Satyendra Desai, Milpitas, CA (US); Ardalan Alizadeh, Milpitas, CA (US); Khashayar Mirfakhraei, Los Altos, CA (US)

(73) Assignee: Cisco Technology, Inc.

( * ) Notice: Subject to any disclaimer, the term of this patent is extended or adjusted under 35 U.S.C. 154(b) by 3 days.

This patent is subject to a terminal disclaimer.

(21) Appl. No.: 18/332,810

(22) Filed: Jun. 12, 2023

(65) Prior Publication Data

US 2023/0328624 A1    Oct. 12, 2023

Related U.S. Application Data

(63) Continuation of application No. 17/145,218, filed on Jan. 8, 2021, now Pat. No. 11,678,248.

(51) Int. Cl.
*H04W 40/16* (2009.01)
*H04W 76/30* (2018.01)
*H04W 80/02* (2009.01)
*H04W 84/12* (2009.01)

(52) U.S. Cl.
CPC .......... *H04W 40/16* (2013.01); *H04W 76/30* (2018.02); *H04W 80/02* (2013.01); *H04W 84/12* (2013.01)

(58) Field of Classification Search
CPC ..... H04W 40/16; H04W 76/30; H04W 80/02; H04W 84/12; H04L 45/22
See application file for complete search history.

(56) References Cited

U.S. PATENT DOCUMENTS

| | | | |
|---|---|---|---|
| 9,521,608 B2 * | 12/2016 | Farid | H04W 76/11 |
| 11,070,467 B1 * | 7/2021 | Shukla | H04W 8/005 |
| 2006/0014536 A1 | 1/2006 | Demirhan et al. | |
| 2006/0056442 A1 * | 3/2006 | DaCosta | H04W 72/1263 370/352 |

(Continued)

OTHER PUBLICATIONS

Wi-Fi 6 Project Team, "Wi-Fi 6 Deployment Guidelines & Scenarios"; WBA Next-Gen Work Group, Jul. 2019, Wireless Broadband Alliance, wballiance.com.

(Continued)

*Primary Examiner* — Will W Lin
(74) *Attorney, Agent, or Firm* — Merchant & Gould P. C.

(57) ABSTRACT

Optimal determination of wireless network pathway configurations may be provided. A computing device may detect, at a first network Access Point (AP), inference on a channel with a second AP. Then, the computing device can check availability of a redundant radio at the second AP. Based on the availability, the computing device can establish a new radio link with the redundant radio at the second AP and reroute data traffic over the new radio link to the second AP. After establishing the new radio link, the computing device can then sever the channel with the second AP.

8 Claims, 14 Drawing Sheets

(56) References Cited

U.S. PATENT DOCUMENTS

| | | | |
|---|---|---|---|
| 2008/0069034 A1* | 3/2008 | Buddhikot | H04L 45/123 370/328 |
| 2009/0129273 A1 | 5/2009 | Zou | |
| 2009/0232026 A1* | 9/2009 | Lu | H04W 40/12 370/254 |
| 2014/0044150 A1* | 2/2014 | Sarca | H04B 1/7183 375/E1.036 |
| 2014/0086120 A1 | 3/2014 | Mishra et al. | |
| 2015/0156815 A1* | 6/2015 | Pang | H04L 45/28 370/338 |
| 2016/0007273 A1* | 1/2016 | Farid | H04W 48/16 370/329 |
| 2016/0345192 A1* | 11/2016 | Garg | H04L 12/2854 |
| 2018/0352497 A1* | 12/2018 | Taskin | H04W 36/38 |
| 2019/0239096 A1* | 8/2019 | Patwardhan | H04W 24/02 |
| 2019/0357290 A1* | 11/2019 | Petria | H04W 24/04 |
| 2020/0013267 A1 | 1/2020 | Amin et al. | |
| 2021/0100050 A1* | 4/2021 | Ho | H04W 88/08 |

OTHER PUBLICATIONS

Commscope, "Ruckus R650"; Oct. 7, 2020, ruckuswireless.com.

Cisco, "Cisco Wireless Controller Configuration Guide, Release 8.6"; Oct. 8, 2020, cisco.com.

International Search Report and Written Opinion issued in corresponding International Patent Application No. PCT/US2022/011054, May 3, 2022.

\* cited by examiner

DYNAMIC RADIO CONFIGURATION FOR SEAMLESS BACKHAUL FREQUENCY OPTIMIZATION

RELATED APPLICATION

This application is a continuation of U.S. patent application Ser. No. 17/145,218, filed Jan. 8, 2021, the disclosure of which is incorporated herein by reference in its entirety.

TECHNICAL FIELD

The present disclosure relates generally to wireless networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several nodes may also work in coordination, either through direct wired or wireless connections in a Wireless Local Area Network (WLAN). The connections between the APs in the WLAN may be referred to as wireless mesh backhaul links. Sometimes it is necessary to change the configuration of these wireless mesh backhaul links.

The WLAN wireless spectrum is typically separated into distinct radio frequency ranges, which may also be further divided into a multitude of channels. Channels can be affected by interference, which may require the APs to switch to another channel. However, channel changes can be a very disruptive process, and the channel changes can be even more disruptive when the channel that needs changing is on the mesh backhaul radios.

BRIEF DESCRIPTION OF THE FIGURES

The accompanying drawings, which are incorporated in and constitute a part of this disclosure, illustrate various example(s) of the present disclosure. In the drawings.

DETAILED DESCRIPTION

Overview

Figure 1A:
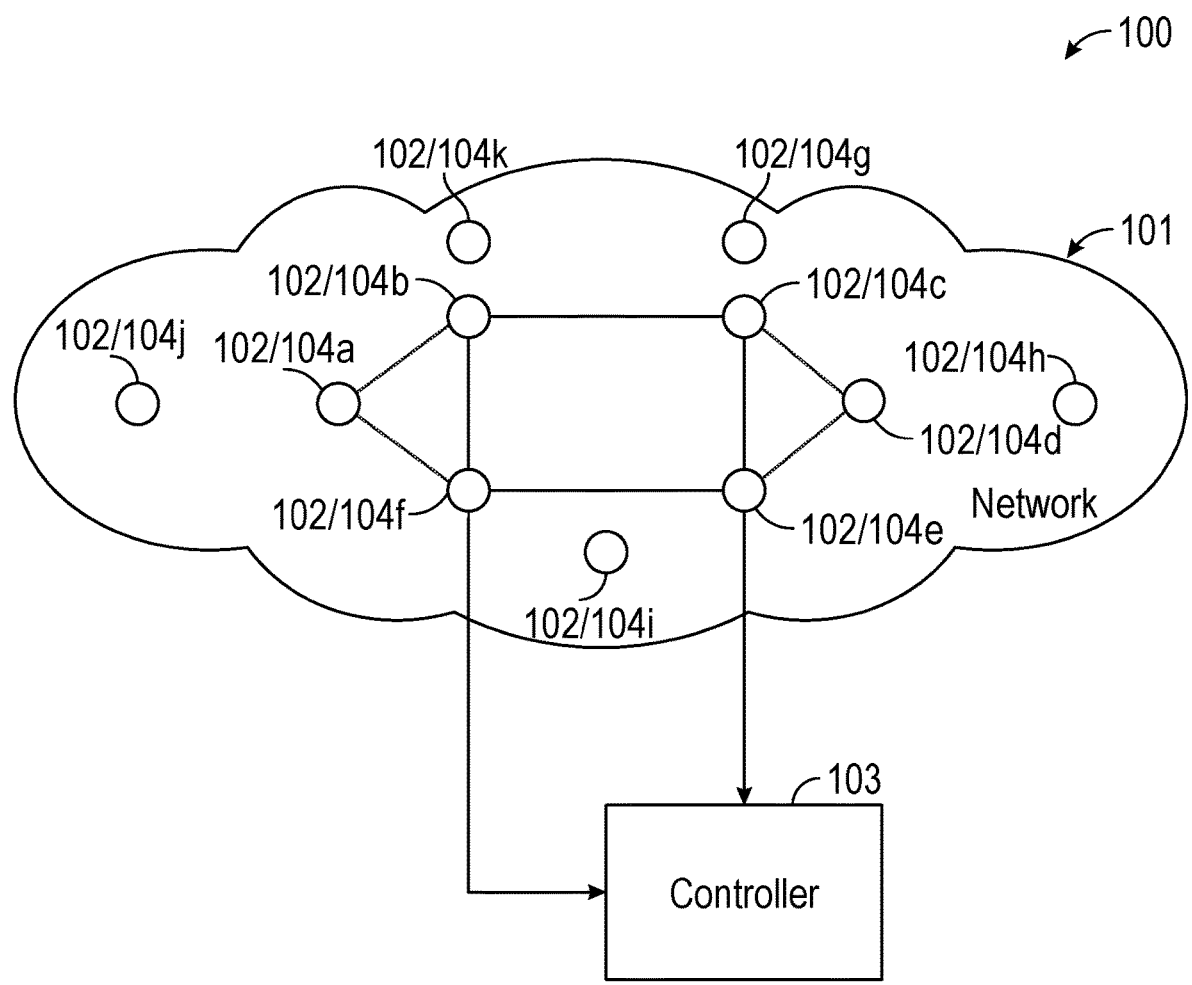
FIG. 1A is a block diagram of wireless network environment in accordance with aspects of the present disclosure.

Optimal determination of wireless network pathway configurations may be provided. A computing device may detect, at a first node, e.g., a first AP, interference on a channel with a second AP. Then, the computing device can check availability of a redundant radio at the second node, e.g., a second AP. Based on the availability, the computing device can establish a new radio link with the redundant radio at the second AP and reroute data traffic over the new radio link to the second AP. After establishing the new radio link, the computing device can then sever the channel with the second AP Both the foregoing overview and the following description are examples and explanatory only, and should not be considered to restrict the disclosure's scope, as described and claimed. Furthermore, features and/or variations may be provided in addition to those described. For example, example of the disclosure may be directed to various feature combinations and sub-combinations described in the example.

Example

The following detailed description refers to the accompanying drawings. Wherever possible, the same reference numbers are used in the drawings and the following description to refer to the same or similar elements. While example(s) of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A WLAN can be formed from two or more nodes. The nodes will be described hereinafter as APs, but, the aspects herein are not limited to APs, as the nodes may be other types of network devices. The connections between APs form a wireless backhaul where data can be communicated through the WLAN before being sent from an AP to a client. In the aspects described herein, the APs can monitor the backhaul links to determine if these backhaul links are suffering from interference. If the AP detects interference at the receiver, the backhaul channel may need to be changed to eliminate or mitigate the interference and continue or improve performance. The channel can be changed at the Rooftop AP (RAP), which may function as a main or controller AP, and for the radios on the dependent APs, referred to as Mesh APs (MAP).

In some circumstances, the interference may be detected at the RAP. Due to the interference, the APs may change the channels at the RAP and any dependent MAPs. Another dependent MAP may be linked to one of the MAPs that will have the channel changed. However, the channel to that other dependent MAP may not need to be changed because the channel to that other dependent MAP may not be detecting interference at any of the radios. To go through the channel change, the RAP and MAP(s) may complete one of three possible processes.

In a first process, the RAP and/or MAP(s) can find and check the candidate radio interface that is redundant and available at the dependent MAP mesh radios. For example, the APs may find that both the 2.4 GHz and the 6 GHz interfaces are available at the dependent MAP radios. The 6 GHz radio can be selected as the candidate radio, and the RAP may send beacons (e.g., Adaptive Wireless Path Protocol (AWPP) beacons) and configure the radios on the RAP and/or MAP(s) for the target channel change.

The choice of the radio can be based on requirements for the mesh network, for example, the network may be servicing many 2.4 GHz capable clients at the APs but may not have any or many 6 GHz clients. Thus, the 2.4 GHz radio may be chosen. This decision as to which radio to choose could also be based on the amount of traffic load on the backhaul and/or the type of traffic. For example, if the load on the backhaul is low and most of the traffic is locally terminating at the mesh nodes, the RAP may choose the 2.4 GHz radio as the candidate radio interface.

Once the new candidate radio is established, the RAP and/or MAPs can establish and then start re-routing the mesh backhaul over the new radio link. After re-routing, the RAP and/or MAPs can sever the interference-prone mesh link or change the channel on that radio link and switch back to that radio link. When the channel change is done with these APs, the network may also make a routing change for the network segments beyond the initial APs. Thus, these other APs may daisy-chain the data. In the example above with the other dependent MAP, the network may have decided that the backhaul link for this other dependent MAP did not need to be changed. Rather, the MAP connected to the RAP can ensure downstream packets, from the RAP and sent over the link that underwent the channel change, are received and daisy-chained over the other radio link down to other dependent MAP(s), as before. In other words, the channel is not changed to the other dependent MAP but data is rerouted to the old link, to the other dependent MAP, from the changed link.

Optionally, as a part of the method above, the RAP can change the channel on the original radio interface, e.g. the 5 GHz radio, and move the connection back to that interface. It is important to note that the network re-configuration can also be driven by a controller or any other entity on the network. The method presented above has many advantages. The change is a seamless channel change, and the APs may never lose connectivity on the backhaul. All the connections above follow a make-before-break approach to ensure persistent connectivity.

As explained above, the candidate redundant radio choice may be based on the type of traffic load, for example, the amount of local traffic compared to the amount of backhaul traffic. The type of traffic can be evaluated during startup or after an initial configuration is applied. The MAPs can track the amount of incoming traffic that is being sent locally over the WLAN between clients (identified as T1 traffic) as compared to the amount of traffic sent to the backhaul (identified as T2 traffic). Similarly, the APs can also measure the amount of traffic coming from the backhaul destined for the clients (identified as T3 traffic) compared to the amount of traffic locally generated and destined for local clients (identified as T4 traffic). The APs can calculate a ratio which indicates the relative Backhaul traffic load versus local traffic load at every MAP. The algorithm for this calculation is:

$$\text{LoadRatio}(AP(i)) = (T2 + T3)/(T1 + T4)$$

If the LoadRatio(MAP(i)) is greater than 1, the ratio indicates that the APs need to configure the faster radios for the backhaul compared to client serving. For example, if the LoadRatio(MAP(i)) is greater than 1, the APs may prefer to configure the 5 GHz or 6 GHz radios for the backhaul rather than the 2.4 GHz.

The second process for conducting the channel change may address Multicast Listener Device (MLD)-oriented dynamic daisy-chaining. A typical MLD operates with two or more radios that work together to achieve a single high-performance Media Access Control (MAC) link. In an example, there are two links, a first link on channel X and a second link on channel Y. The channel change condition under consideration can apply to both Simultaneous Transmit and Receive (STR) and non-STR MLD based backhaul links.

In an implementation, the AP can determine which dependent MLD radios may need a channel change. The AP may then detach the MAC Service Access Point (SAP) from the radios subject to the channel change. For example, to change the channel for the 5 GHz radio, the AP can detach the MAC SAP from the 5 GHz radios and bind the MAC SAPs to the 6 GHz radio. The AP can then dynamically send backhaul traffic to a single link in the MLD, for example, connect the MAC SAP to a single radio. Then, the AP can change the channel on the 5 GHz radio and re-attach the MAC SAP across both radios. The AP can then reset the sequence numbering at the MAC level to avoid any out-of-order packets.

The third process can address dynamic daisy-chaining for coalesced radios. Radio coalescing is a mechanism by which two or more radios are "merged" into one for the purpose of improving performance. For example, the AP can combine two 4×4 Irons into a single 8×8 MAC interface. A coalesced radio can provide higher throughput compared to a single 4×4 radio.

First, the AP can decide that a channel change may be required on a mesh link that has a coalesced radio interface. In a first stage, both the radios, at the two APs, may be coalesced into 8×8 radio(s) and operating over channel X. The AP can decouple the MAC SAP on the radios and limit packets from both sides to a 4×4 mode. Then, with the radios split and operating as two independent net devices, the AP can proceed to change to the target channel Y, as described above. Once the radios have discovered and connected to each other on channel Y, the AP can sever the link on the channel X radios. Then, the AP can also change the channel on the unused radios to the new channel Y. Finally, the radios can be coalesced back into a single MAC instance for operation in the 8×8 mode.

The above example proposes a channel change with the radio getting coalesced from two 4×4 antenna configuration to an 8×8 configuration. However, the process can be extended to other radio configurations. For example, a similar approach would work if one end of the mesh link has a coalesced radio while the other node does not use a coalesced radio.

The processes above have several advantages. The switch to a new channel on the backhaul link is seamless, for example, there is no loss of connectivity and there is zero outage. The processes can be triggered on other events, for example, channel changes, radar and/or radio resets, any other outages, and/or noise and interference at the receiver. The network re-configuration can be automatic for the administrator and keeps management simple. Finally, if the number of radios increases per AP, the processes above can manage the network while simplifying the design of the AP and/or network.

A wireless environment 100 may be as shown in FIG. 1. The wireless environment 100 can include a wireless local area network 101, which can include two or more nodes, e.g., APs 102. The wireless network 101 can be controlled by a controller 103, e.g., a Wireless Local Area Network (WLAN) controller (WLC), a network controller, etc. The AP 102, or other devices, and the controller 103 may be computer systems or other devices as described in conjunction with FIGS. 6A and 6B.

The one or more APs 102/104 may form a wireless network 101, for example, a wireless mesh network. The wireless network 101 may be composed of two or more APs 102/104. The APs 102/104 can join and/or communicate together to form a wireless backhaul, which may be capable of communicating data from one client to another. The wireless backhaul may be formed by one or more links between the APs, as may be shown in FIGS. 1A-1H. For example, an ingress AP 102/104a may communicate information or data to an egress AP 102/104d from one client, communicating with the ingress AP 102/104a, to another client, communicating with the egress AP 106d. However, AP 102/104a may not communicate directly with AP 102/104d. As such, the AP 102/104a may form one or more wireless backhaul links to communicate data through one or more intermediary APs 102/104 between AP 102/104a and AP 102/104d. For example, there may be a wireless backhaul segment from AP 102/104a to AP 102/104b, then to AP 102/104c, and finally to AP 102/104d. These track segments may communicate over a radio channel.

The WLAN may be controlled by a controller 103, e.g., a WLC. The controller 103 can communicate with the one or more APs 102/104 within the WLAN 101. The controller 103 can receive information about link errors from the one or more APs 102/104. Further, the controller 103 can determine how to change a channel on a radio interface to address the link errors. Thus, the processes, etc., described herein can be conducted by the AP 102/104 and/or by the controller 103.

Various types of wireless links may be implemented by the wireless network 101, as may be shown in FIGS. 1B through 1H. The APs 102/104a, 112, 114, and/or 118 may configure links and/or radio channels to avoid errors or interference. Representations of one or more wireless backhaul link(s) may be implemented between an ingress AP 102/104a and an egress AP 102/104b, as may be shown in FIGS. 1B-1H. The wireless network 101 can include a Rooftop AP (RAP) 102 and one or more Mesh AP(s) (MAP) 104. In implementations, the RAP 102 may function to control functions of the MAPs 104.

In an example, there may be one or more errors occurring in one or more APs 102/104 or link segments between the APs 102/104. These errors may make communication between the APs 102/104 difficult or impossible, or may affect data quality or service quality. Regardless, the errors may require a rerouting of the data traffic between the APs 102/104 of the wireless network 101, as shown in FIGS. 1B-1H.

As stated above and as shown in FIG. 1A, wireless network 101 may comprise Wi-Fi APs 102/104 (e.g., first AP 102/104a and/or second AP 102/104b) that may be configured to support a wireless (e.g., Wi-Fi) network 101. The APs 102/104 may comprise a physical location where a user, operating client device, may obtain access to a wireless network 101 (e.g., Internet access), using Wi-Fi technology, via a WLAN using a router connected to a service provider.

In other example(s) of the disclosure, rather than APs, devices may be used that may be connected to a cellular network that may communicate directly and wirelessly with end use devices (e.g., a client device) to provide access to wireless network 101 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, example of the disclosure may use wireless communication protocols using, for example, Wi-Fi technologies, cellular networks, or any other type of wireless communications.

Client devices (not shown) may comprise, but are not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

The elements described above of wireless network 101 (e.g., WLC 103, first AP 102/104a, second AP 102/104b, etc.) may be practiced in hardware, in software (including firmware, resident software, micro-code, etc.), in a combination of hardware and software, or in any other circuits or systems. The elements of wireless network 101 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-Chip (SOC), etc.), a circuit utilizing a microprocessor, or on a single chip containing electronic elements or microprocessors. Furthermore, the elements of wireless network 101 may also be practiced using other technologies capable of performing logical operations such as, for example, AND, OR, and NOT, including but not limited to, mechanical, optical, fluidic, and quantum technologies. As described in greater detail below with respect to FIGS. 6A and 6B, the elements of wireless network 101 may be practiced in a computing device 600 and/or wireless device 630.

Figure 1B:
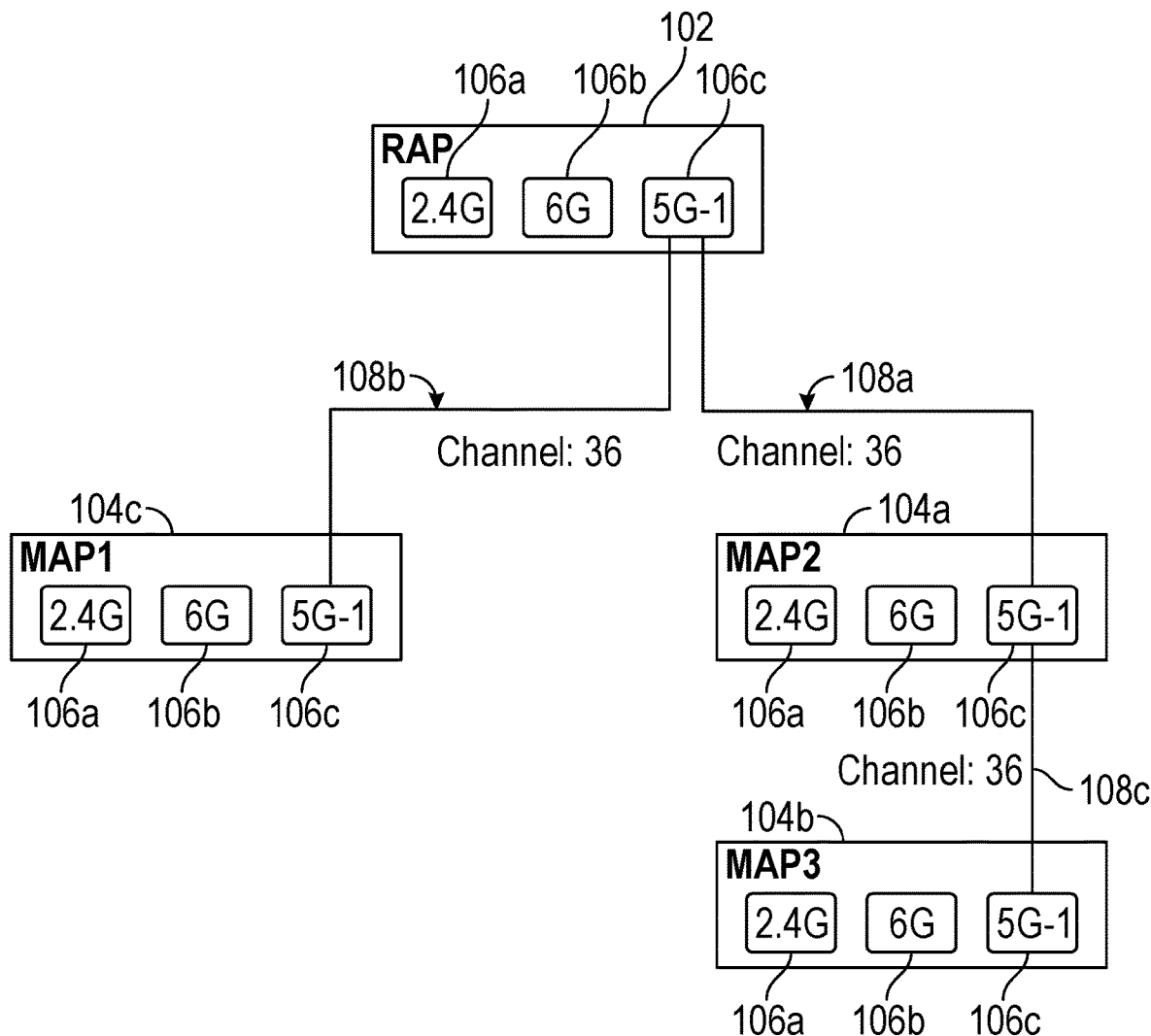
FIG. 1B is another block diagram of wireless network environment in accordance with aspects of the present disclosure.
Figure 1C:
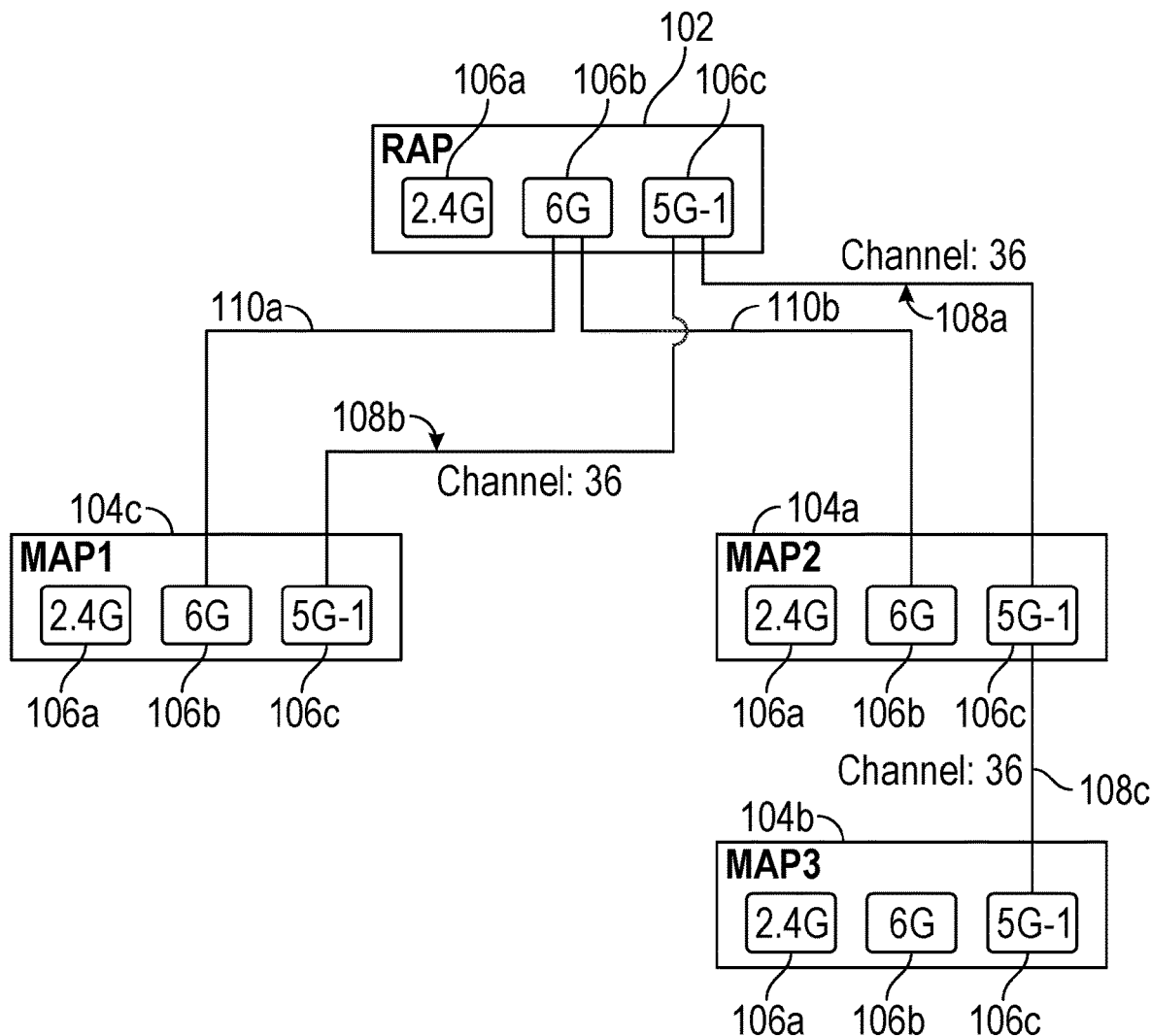
FIG. 1C is another block diagram of wireless network environment in accordance with aspects of the present disclosure.
Figure 1D:
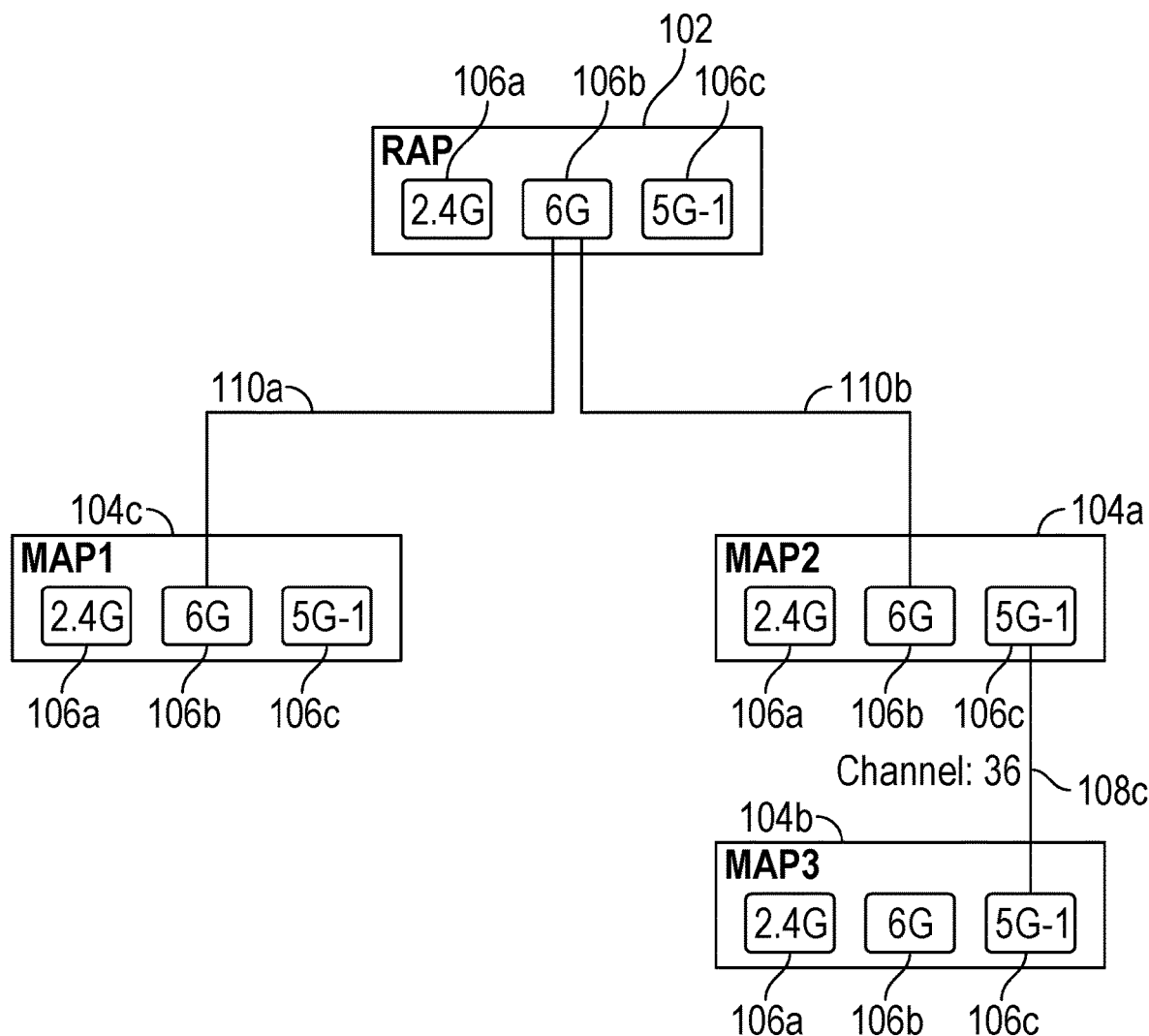
FIG. 1D is another block diagram of wireless network environment in accordance with aspects of the present disclosure.
Figure 1E:
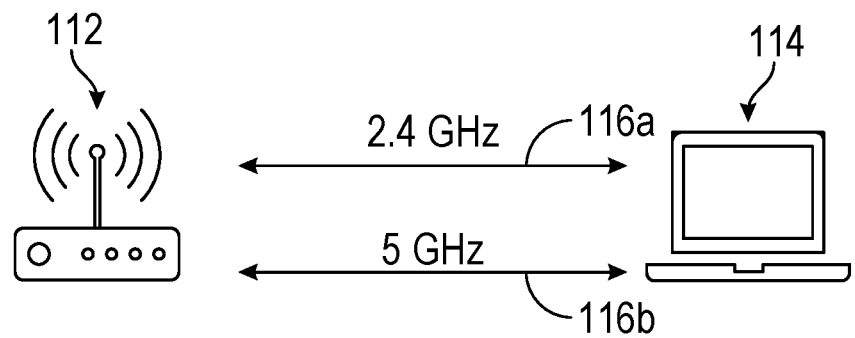
FIG. 1E is another block diagram of wireless network environment in accordance with aspects of the present disclosure.
Figure 1E:
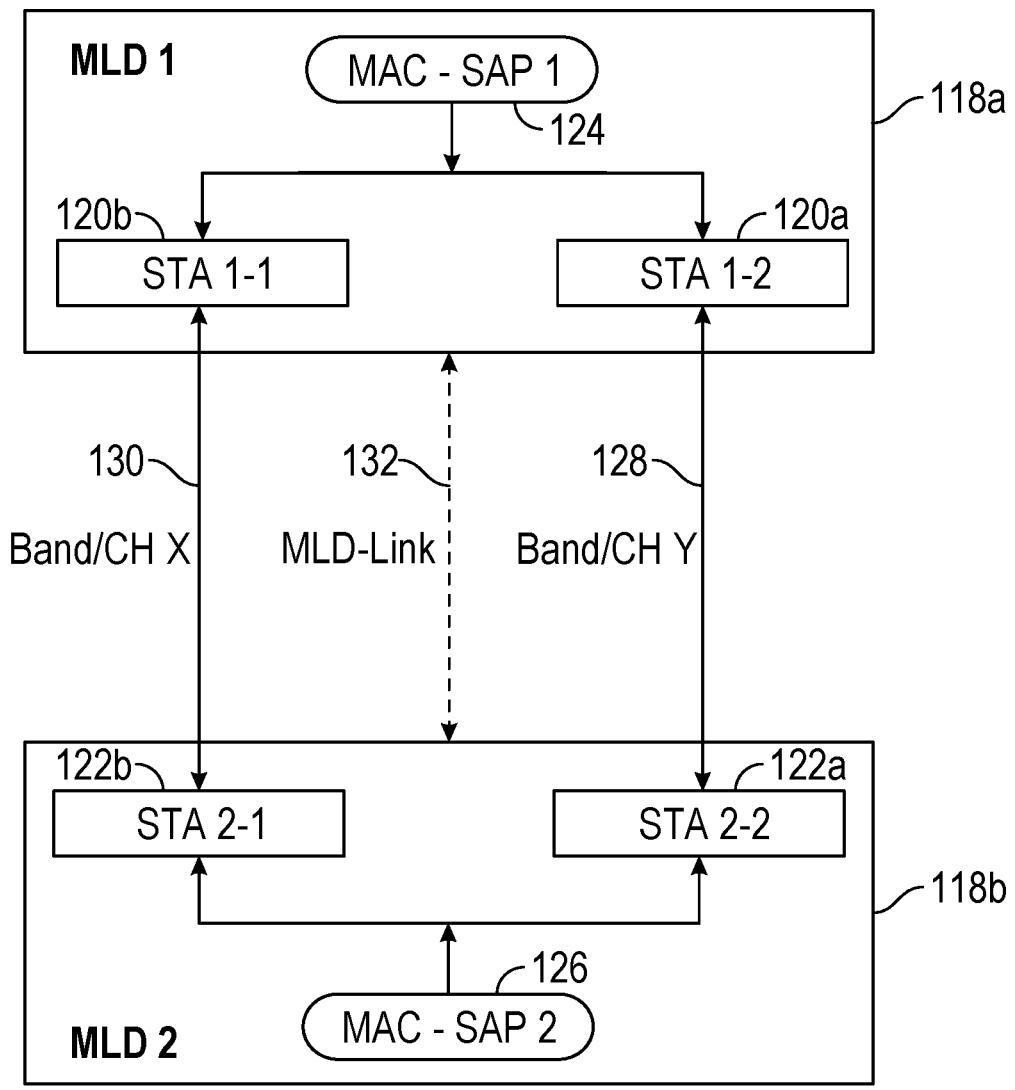
Figure 1F:
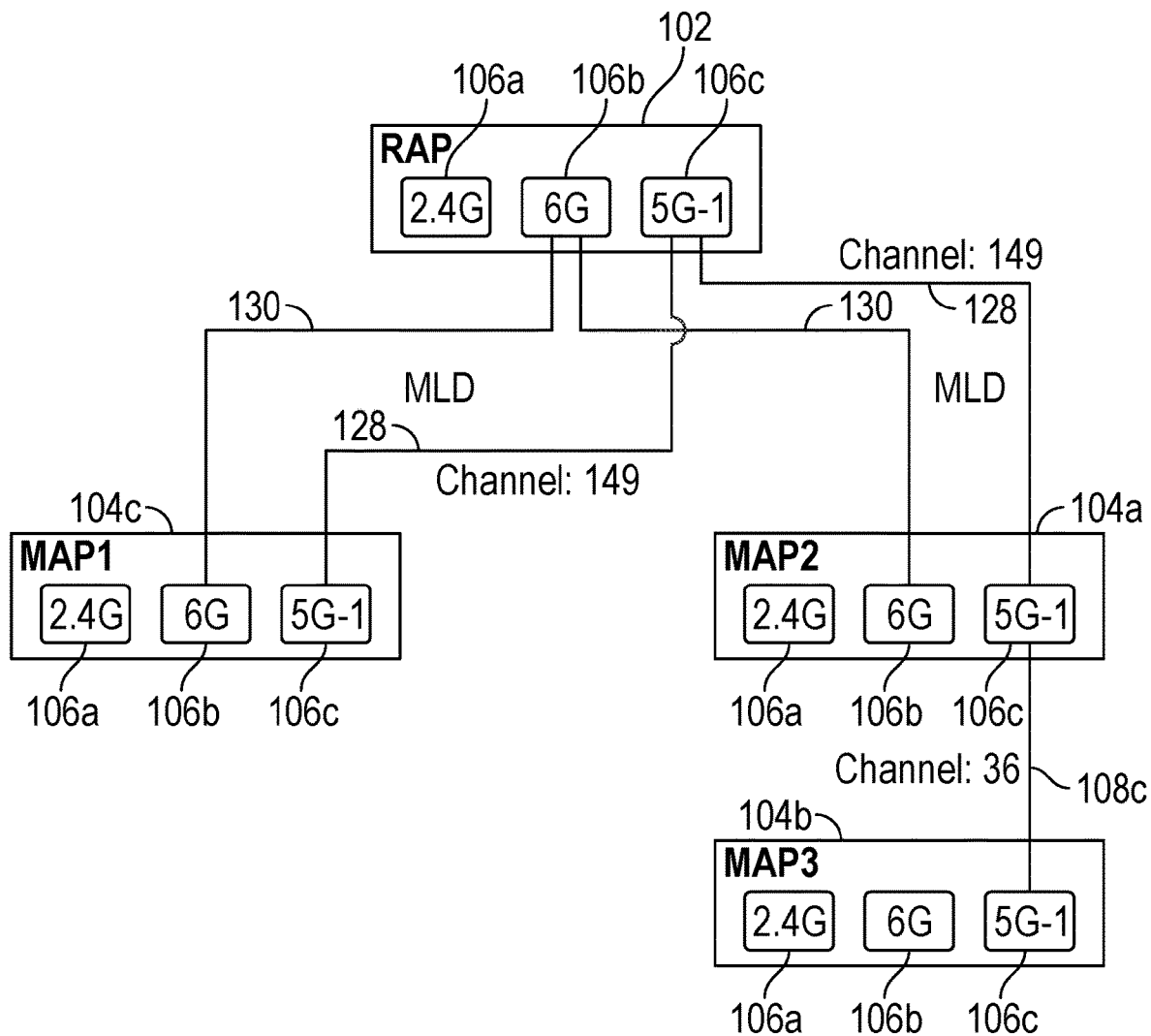
FIG. 1F is another block diagram of wireless network environment in accordance with aspects of the present disclosure.
Figure 1G:
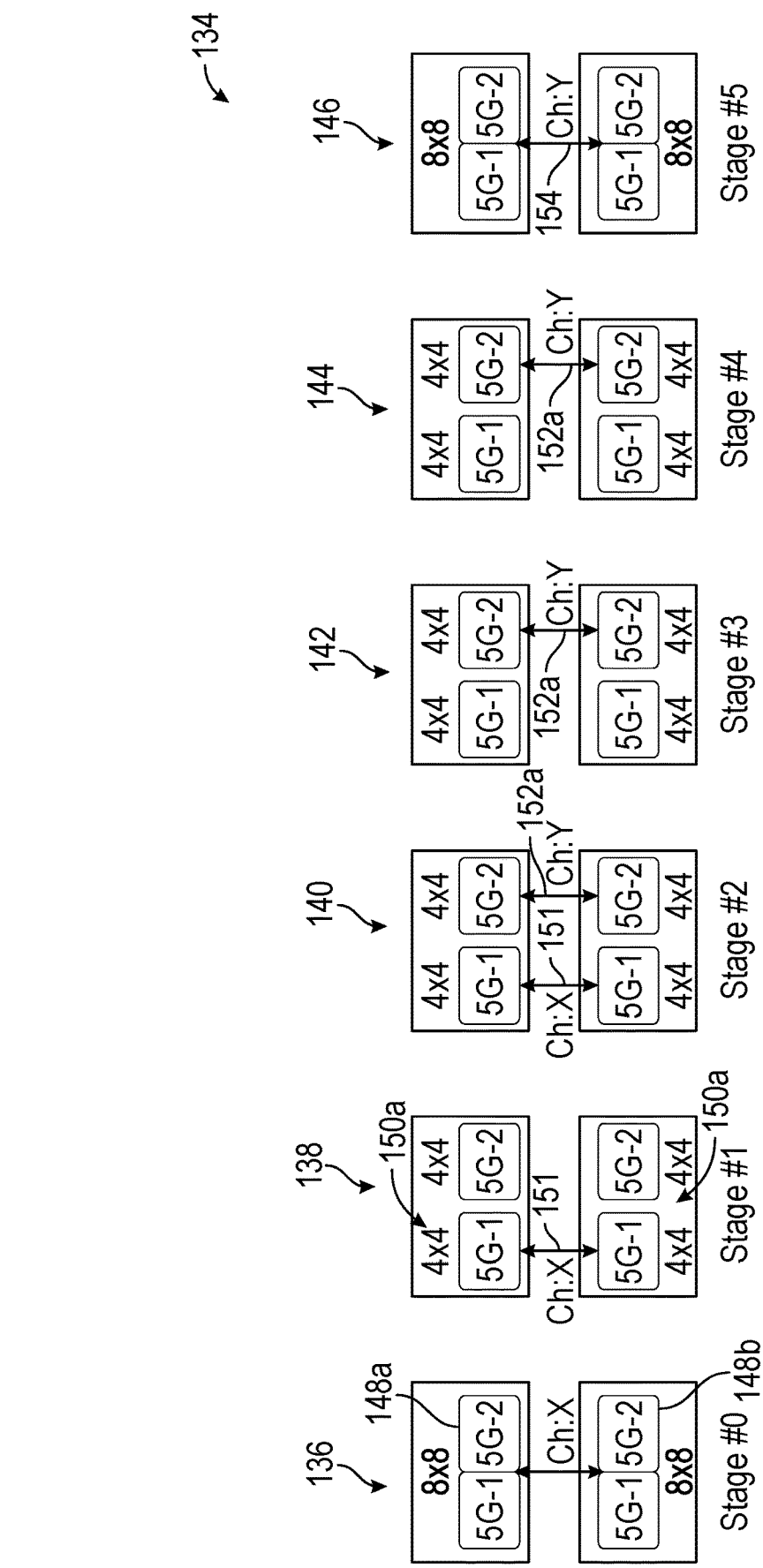
FIG. 1G is another block diagram of wireless network environment in accordance with aspects of the present disclosure.
Figure 1H:
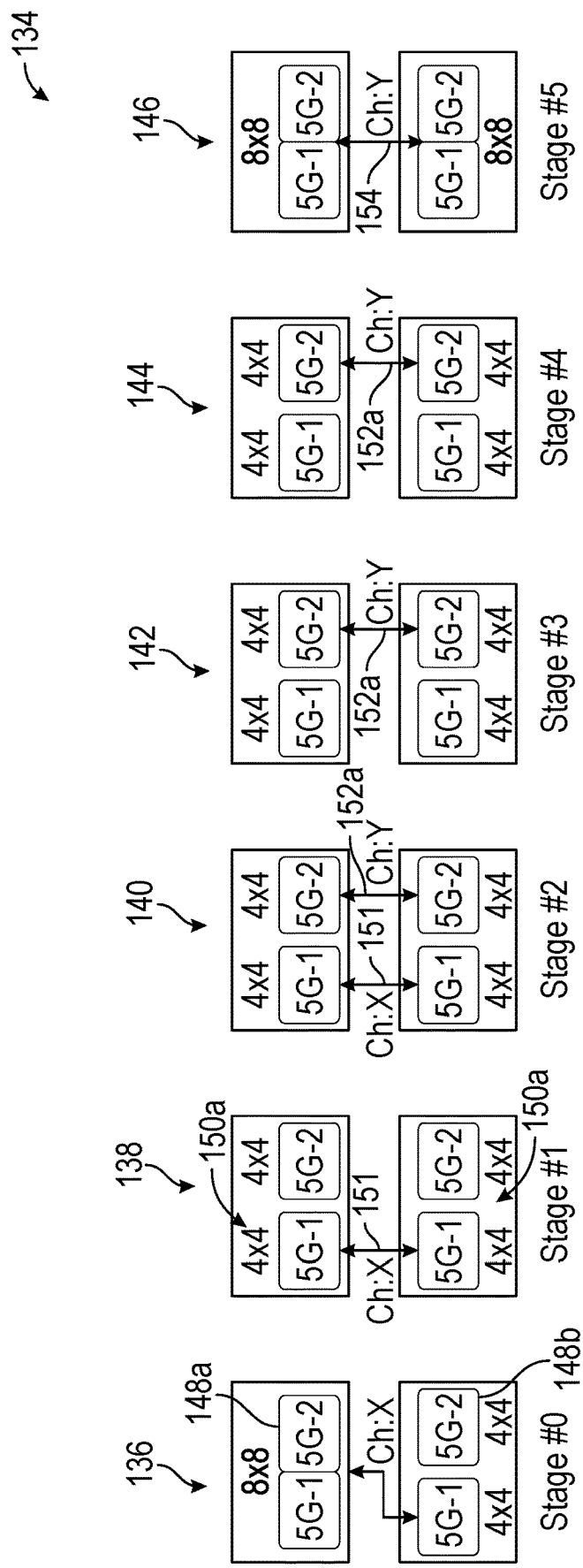
FIG. 1H is another block diagram of wireless network environment in accordance with aspects of the present disclosure.
Figure 2:
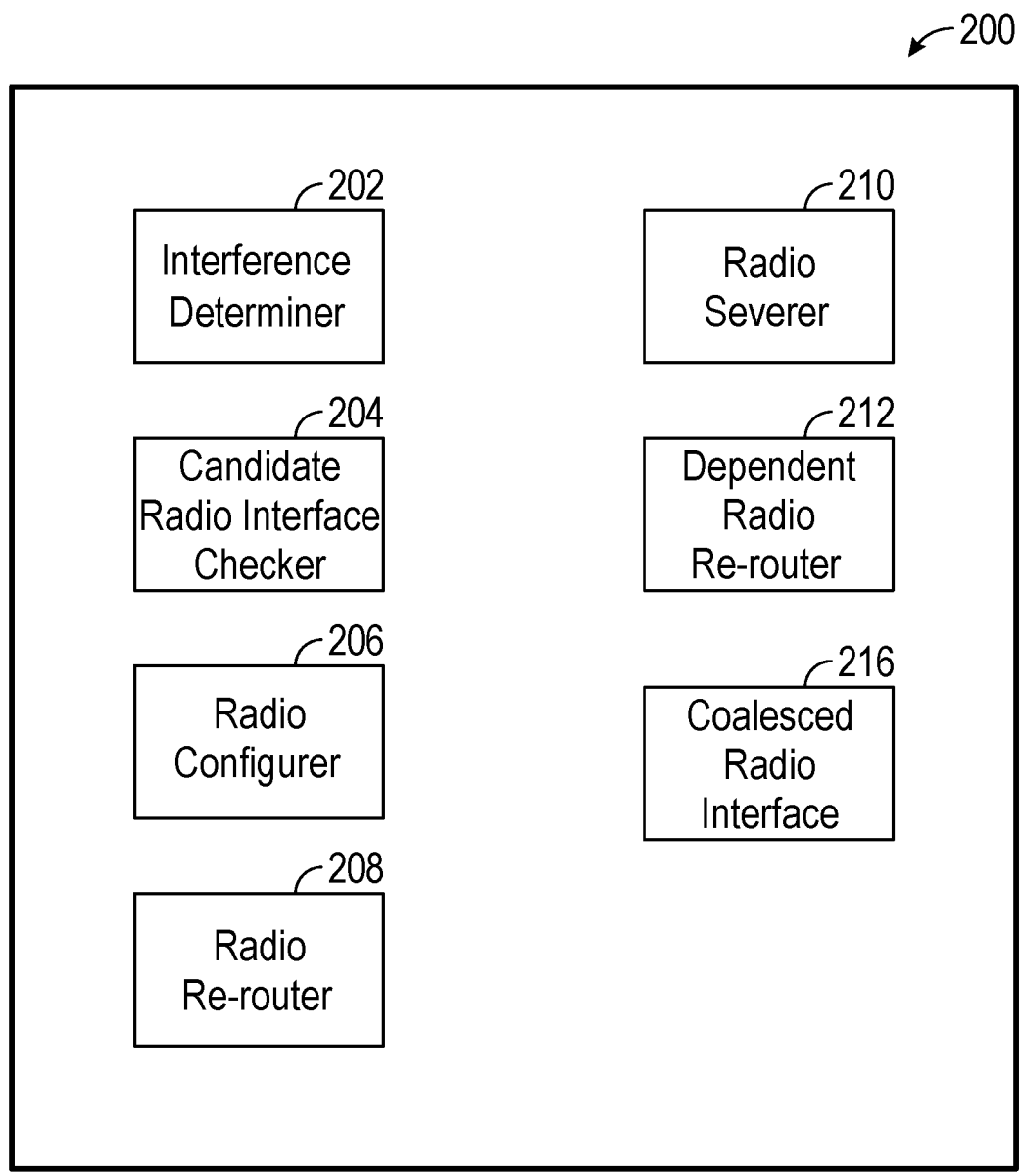
FIG. 2 is a block diagram of an AP or other network node device in accordance with aspects of the present disclosure.

An implementation of the different hardware, software, or combination of hardware software for the AP 102/104 and or the controller 103 may be as shown in FIG. 2. The device 200 may represent one or more of the APs 102/104 or the controller 103, described in conjunction with FIGS. 1A through 1H. The device 200 can include one or more of, but is not limited to, an interference determiner 202, a candidate radio interference checker 204, a radio configurer 206, a radio re-router 208, a radio severer 210, a dependent radio re-router 212, and/or a coalesced radio interface 216. The device 200 may be a computer device or computing system implementation 600, as described in conjunction with FIGS. 6A and 6B.

The interference determiner 202 can detect, measure, or analyze an interface between an RAP 102 and one or more MAPs 104 and/or between one MAP 104 and another MAP 104. The interference determiner 202 can measure Quality Of Service (QOS) indicators, for example, data loss, packet delays, or other types of measures and metrics to determine if there is interference on an existing radio channel/interface. The interference determiner 202 can detect interference on a single radio interface 106 or on multiple radios 106a through 106c. For example, the interference determiner 202 can monitor the active radio, e.g., radio 106c, which is currently sending or receiving data. If interference is detected or crosses some threshold for the active radio 106c, the interference determiner 202 can send the interference indication and/or information to the radio configurer 206.

The candidate radio interference checker 204 can check for interference on unused radio interfaces. For example, if the 5 GHz radio 106c is currently being used as shown in FIG. 1B, the candidate radio interference checker 204 may check the 6 GHz radio 106b or the 2.4 GHz radio 106a to determine if there is interference in those signals being received by or sent to other APs 102/104 or may check for interference by measurement of the WLAN environment 101. The candidate radio interference checker 204 can then pass this interference information to the radio configurer 206 to determine if a switch to a different radio may help improve the QOS, improve other types of measurements, or improve the service to the clients. Further, the candidate radio interference checker 204 may also check the dependent APs, for example, MAP 104c, and MAP2 104a, to determine if the other redundant radios on those APs 104 are both available and also not being affected by interference or some other type of degradation. This checking may occur by message exchange between the RAP 102 and MAPs 104. In other implementations, the RAP 102 can determine a configuration of the MAP(s) 104 based on an exchange of data packets or control signals, or other types of measures or information.

The radio configurer 206 can configure a candidate radio interface to switch to and prepare that radio interface for changes to route the traffic between APs 102, 104. The radio configurer 206 can prepare, for example, the 6 GHz radio 106b to take or assume data traffic from the 5 GHz radio 106c, for example. The radio configurer 206 can configure the 6 GHz radio to begin accepting or sending data or doing other types of actions to reroute the data signal. Further, the radio configurer 206 can direct or can instruct the MAPs 104 also to configure their radio interfaces, such that a link is established between the RAP 102 and MAP(s) 104 over the new radio link.

The radio re-router 208 can then begin to reroute signals over the new interface. The previous radio interface may include a queue that can be changed or rerouted to send the queued signals to the new radio interface. For example, any type of messages that are to be sent over the 5 GHz radio 106a may then be routed to the newly established link over the 6 GHz radio 106b. For example, as shown in FIG. 1C, the link of the 5 GHz radio 108a, 108b may be maintained, but as data is to be sent over the 5 GHz radio, the data can be rerouted to the 6 GHz radio to send over link 110a, 110b. The radio re-router 208 determines when the 5 GHz radio 106c queue has completed sending data. Once completed, the radio re-router 208 can send the completion information to the radio severer 210.

The radio severer 210, upon completion of the final data or messages being sent over the 5 GHz radio 106a, may sever the link 108a, 108b to the dependent MAPs 104. Thus, the 5 GHz connections are eliminated, as shown in FIG. 1D. At that point, the connection between the RAP 102 and MAP(s) 104 is only over the 6 GHz radio 106b. Thus, the radio severer 210 ensures that the old link is only severed upon the establishment of the new link 110.

The dependent radio re-router 212 can instruct the dependent radios 106 to insure rerouting of the data signals at those dependent MAPs 104. For example, the dependent radio re-router 212, of the RAP 102, can send instructions to the MAPs 104a, 104c to complete the link 110a, 110b to the newly configured 6 GHz radio interface. In this way, the RAP 102 can instruct the dependent MAPs 104a, 104c to change routing to the newly establish radio link while still maintaining the old radio link 108a, 108b (as shown in FIG. 1C), before the MAPs 104a, 104c disconnect or discontinue the old radio link 108a, 108b after the new radio interface link 110a, 110b has been established.

To establish the rerouting, the radio configurer 206 of the RAP 102 may send beacons (e.g., Adaptive Wireless Path Protocol (AWPP)) to begin the configuration of the channel change. The radio configurer 206 can also choose which radio to switch to based on the responses to the beacons. The radio configurer 206 can choose which radio to use based on the clients being serviced and types of connections and/or data being exchanged between the RAP 102 and MAPs 104 and/or between MAPs 104.

This radio decision may also be based on the model load on the backhaul. The model may determine if the load on the backhaul is low (e.g., at or below a predetermined threshold, for example, 30%, of the maximum possible bandwidth and/or data capacity). Further, the model can compare the traffic terminations to a predetermined threshold to determine whether that traffic is mostly terminated at the MAPs 104 (e.g., 90% of the traffic is terminated at the MAPs 104 (other thresholds are possible)). Further, the model can compare the traffic terminations to another predetermined threshold to determine whether that traffic is using the backhaul for internetwork transmissions at the MAPs 104 (e.g., 30% of the traffic sending traffic to other networks (other thresholds are possible)). Based on the information determined in the wireless network 101, the model can determine the radio interface to which to switch. For example, if the traffic is low and/or the traffic is being terminated mostly at the MAPs 104, the radio configurer 206 may choose the 2.4 GHz radio 106a, as a better use of bandwidth.

Further, the dependent MAPs, e.g., MAP2 104a, may have further connection(s) to other dependent MAP(s), e.g., MAP3 104b. These further links, e.g., 108c, may require further channel changes or other configurations. For example, if the 5 GHz link 108c between MAP 104a and MAP 104b is not subject to interference, then the 5 GHz radio interface link 108c can be maintained. Thus, any data coming from the 6 GHz radio link 110b into MAP2 104a may need to be rerouted, from the 6 GHz radio 106b to the 5 GHz radio 106c, in MAP2 104A. These configurations above can be made by the dependent radio re-router 212 on RAP 102 or on MAP2 104a. In this way, the links from the 6 GHz radio 106b to the 5 GHz radio 106c are daisy-chained from the RAP 102, to the MAP2 104, and then to the MAP3 104b. This daisy-chaining, using different radio interfaces 106, allows for optimizing radio links (e.g., eliminating interference-prone links) while not needing to change links that are not being affected. Thus, the total network configuration is optimized for ensuring quality of service.

It should be noted that it is possible to change the channel on an original radio link and then move back to the original interface connection after the channel change. Further, the RAP 102 and MAP(s) 104 may make the channel changes or the changes may be made by a controller 103. Regardless, the connections are a make-before-break configuration. For example, the switch to the 6 GHz radios 106b, explained above, occurs but the old 5 GHz link 108 is not eliminated or severed until the switch to the 6G radio 106b is completed. This process mitigates issues with a drop in service that clients could see with other types of radio link changes.

The radio re-router 208 can evaluate the redundant radios and which link(s) to use based on whether the traffic load is either local or on the backhaul. Thus, for example, the MAPs 104 can track the amount of incoming traffic that is either being sent locally to the client(s) compared to the amount of traffic that is being sent to the backhaul. A ratio of backhaul traffic load to local load may be computed. The RAP 102 or MAP(s) 104, for example, can solve an algorithm: LoadRatio(MAP(i))=(T2+T3)/(T1+T4). In the algorithm, T1 is the amount of incoming traffic that is being sent locally over the WLAN 101; T2 is the amount of traffic sent to the backhaul. Further, T3 is the amount of traffic coming from the backhaul destined for the clients, and T4 is the amount of traffic locally generated and destined for the clients. If the LoadRatio is greater than one, then there is more backhaul traffic than local traffic, and a configuration to the faster radios, for example, the 6 GHz radio 106b, is warranted. However, if the LoadRatio is less than one and there is more local traffic than backhaul traffic, then a configuration to a lower speed interface, for example, the 2.4 GHz radio 106a, may be more appropriate.

The coalesced radio interface 216 may allow for switching of the channels when coalesced radios are being employed. Coalesced radios are separate radios that can be combined into one radio having more bandwidth. These coalesced radios need to be severed or broke into independent radios before switching channels. The coalesced radio interface 216 can complete the instructions for such switching of coalesced radios.

Figure 3:
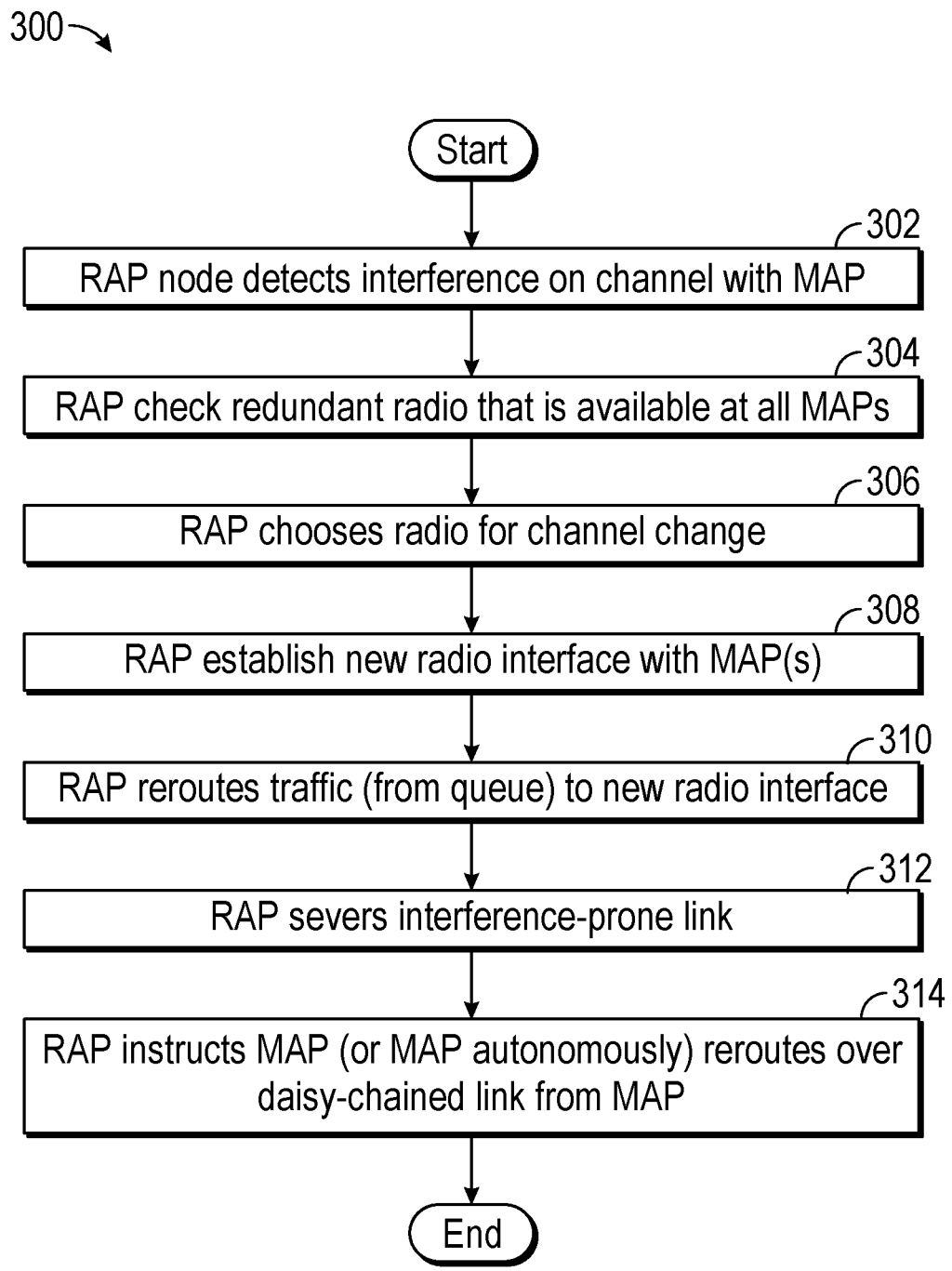
FIG. 3 is a flow chart of a method for changing the frequency band and/or the channel of a wireless mesh backhaul in accordance with aspects of the present disclosure.

Referring now to FIG. 3, a method 300 may be shown for switching radio channel interfaces or links in an wireless environment 100. The method 300 may be explained in conjunction with FIGS. 1B through 1D. The method 300 can start with a start operation and can end with an end operation. The method 300 can include more or fewer stages or can arrange the order of the stages differently than those shown in FIG. 3. The method 300 can be executed as a set of computer-executable instructions, executed by a computer system or processing component, and be encoded or stored on a storage medium. Further, the method 300 can be executed by a gate or other hardware device or component in an ASIC, a FPGA, a SOC, or other type of hardware device. Hereinafter, the method 300 shall be explained with reference to the systems, components, modules, software, data structures, etc. described herein.

In an implementation, the RAP 102 can detect interference on a channel connected to an MAP 104, in stage 302. The interference determiner 202 can determine if there is some type of interference or degradation in the link(s) 108 between the RAP 102 and MAP(s) 104. For example, there may be degradation on link 108b between the 5 GHz radios 106c on the link between RAP 102 and MAP 104c. The interference can include a loss of data, a degradation in the QOS measures, or some other type of issue with the link 108b to MAP 104C. Other links, e.g., 108a, 108c may also be evaluated by the RAP 102 and/or MAP(s) 104a, 104b, and/or 104c.

The RAP 102 may then check whether a redundant radio may be available at the MAP(s) 104, in stage 304. The candidate radio interference checker 204 may check and/or determine if another radio, for example, the 6 GHz radio 106b, may be available and can be connected to the MAP(s) 104 from the RAP 102. For example, the connection to the 6 GHz radio 106b must be available at both the MAP1 104c and MAP2 104a. As such, the candidate radio interference checker 204 can determine if the 6 GHz radio 106b is available at the MAP 104 by signals being sent to the MAP 104 or an exchange of communications or other data packets between the RAP 102 and the MAPs 104c, 104a. The candidate radio interference checker 204 can also determine if any type of data loss or signal degradation may be occurring in the 6 GHz radio 106b, or other candidate radio, based on other traffic being sent to the RAP 102.

The RAP 102 may then choose the radio for the channel change, in stage 306. For example, the radio configurer 206, of the RAP 102, can determine (if the 5 GHz radio 106c is currently being used) whether the 2.4 GHz radio 106a or the 6 GHz radio 106b is to be chosen for communications between the RAP 102 ad MAP(s) 104a, 104c. The determination of the candidate radio may be based on the LoadRatio, as described above, which may be based on the load characteristics of, or the type traffic being communicated at, the RAP 102 and/or MAP(s) 104. Depending on the solution of the LoadRatio, as described before, the radio configurer 206 can determine which radio to establish as a new radio interface.

The RAP 102 may then establish the new radio interface with MAPs 104, in stage 308. The radio configurer 206 may send beacons, other signals, or data packets between the RAP 102 and the MAP 104 to establish the new radio link 110. These packets or beacons may instruct the MAP 104 to switch to the new radio, for example, to the 6 GHz radio 106b. Once the new radios links 110a, 110b are established between the RAP 102 and the MAPs 104a and 104c, the data traffic may begin to be rerouted to that new radio interface at both the RAP 102 and the MAPs 104a and 104c. The previous channel and the new radio link are in different frequency bands.

The RAP 102 may then reroute traffic, for example from a data queue associated with the old radio, for example, the 5 GHz radio 106c, to the new radio interface, for example, the 6 GHz radio 106b, in stage 310. The radio re-router 208 can now reroute data, from a queue of data packets or signals, which are being sent over old radio, for example, the 5 GHz radio 106c, to the new radio interface, e.g., the 6 GHz radio 106b, to be sent over links 110. The radio re-router 208 changes the data packets or performance of the radios 106 inside the RAP 102, and MAPs 104 to empty the queue on the old radio interface, e.g., the 5 GHz radio interface 106c.

After rerouting is established, the RAP 102 can sever the interference prone link, in stage 312. For example, after the radio re-router 208 completes rerouting traffic through the new radio link 110a, 110b, the radio severer 210 can sever or discontinue the links 108a, 108b on the old 5 GHz radio interfaces 106c. Thus, the new link 110 is established before the elimination or teardown of the other link 108. In this way, no data is lost during the establishment of the new radio link 110, and the clients are unaware of the switching between the radio interfaces 106.

The RAP 102 may then instruct the one or more MAP(s) 104, to reroute or change traffic over a daisy-chained link from the MAP 104 to another MAP 104, in stage 314. The dependent radio re-router 212, of the RAP 102, can send instructions to the MAP(s) 104 to change the routing of traffic at the MAP(s) 104. For example, the dependent radio re-router 212 can send instructions to MAP2 104*a* to change the link 108*c* between MAP2 104*a* and MAP3 104*b*. However if there is no interface interference over link 108*c*, the MAP2 104*a* may disregard the instructions and continue to use the radio link 108*c* over the 5 GHz interface 106*c*. If the link 108*c* is not experiencing interference, the MAP2 104*a* may communicate as such to the RAP 102, which will not send instructions, as above, in response. In these situations, MAP2 104*a* may be instructed to route traffic from the new interface, e.g., the 6 GHz interface 106*b*, from the RAP 102 to MAP2 104*a*, to the existing link 108*c*, on the 5 GHz interface 106*c* that communicates to MAP3 104. In other situations, the MAP2 104*a* may change the link 108*c* to the 6 GHz link between MAP2 104*a* and MAP3 104*b*. The MAP3 104*b* may have the same or similar components as is shown in FIG. 2, to help change the link between the two MAP(s) 104*a*, 104*b*.

Figure 4:
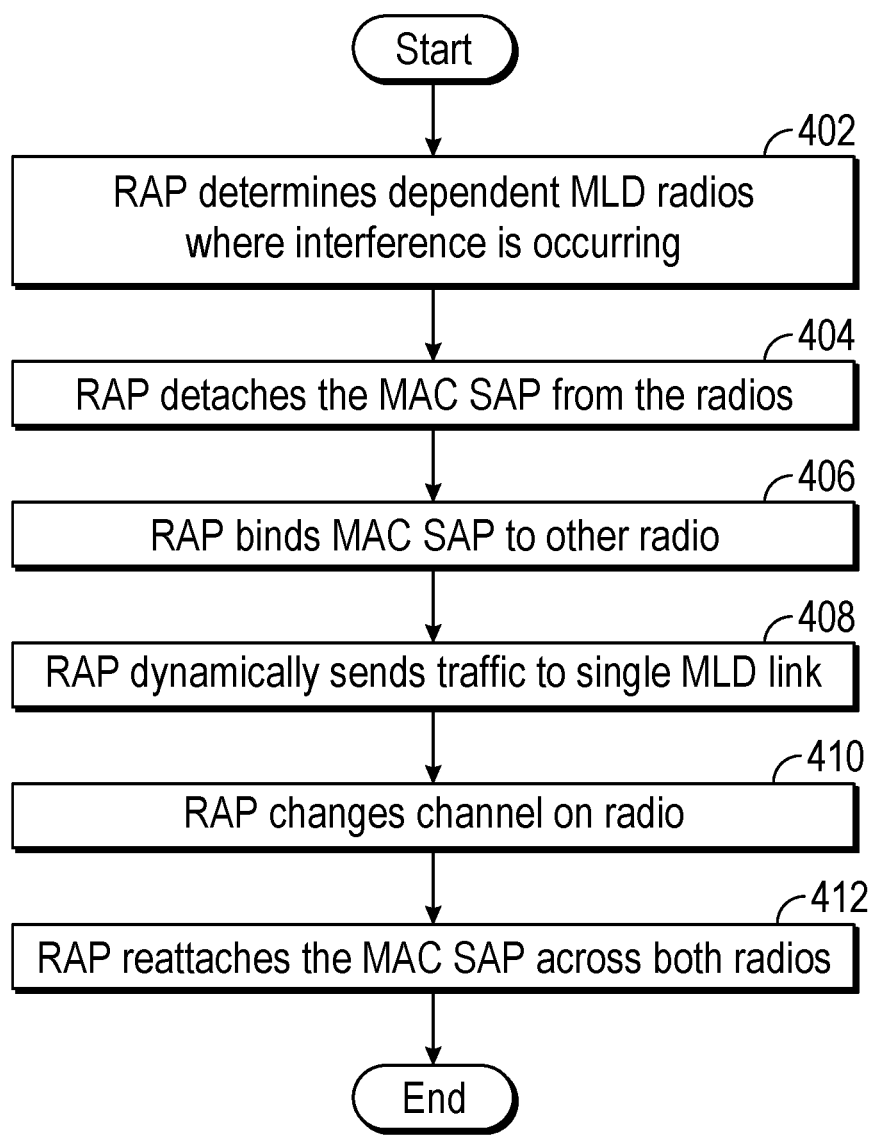
FIG. 4 is another flow chart of a method for changing the frequency band and/or the channel of a wireless mesh backhaul in accordance with aspects of the present disclosure.

Another implementation of a method 400 for changing the radio interfaces between devices may be as shown in FIG. 4. The method 400 may be explained in conjunction with FIGS. 1E and 1F. The method 400 can start with a start operation and can end with an end operation. The method 400 can include more or fewer stages or can arrange the order of the stages differently than those shown in FIG. 4. The method 400 can be executed as a set of computer-executable instructions, executed by a computer system or processing component, and be encoded or stored on a storage medium. Further, the method 400 can be executed by a gate or other hardware device or component in an ASIC, a FPGA, a SOC, or other type of hardware device. Hereinafter, the method 400 shall be explained with reference to the systems, components, modules, software, data structures, etc. described herein.

Multicast Listener Discovery (MLD) devices, e.g., devices 112 and 114, may use multiple links, e.g., links 116*a* and 116*b*, to send and receive data. These dual links 116 may be over different radios, e.g., a 2.4 GHz radio 116*a* and a 5 GHz radio 116*b*. One or both of these links could suffer from interference or other issues.

An example of two MLD devices 118*a*, 118*b*, which may use multiple bands/channels 128, 130, and/or 132 for the backhaul, is as shown in FIGS. 1E and 1F. The method 400 can work for both simultaneous transmit and receive (STR) and non-STR MLD devices. The MLD devices 118 may be transmitting over the backhaul link on both a first channel 128 and a second channel 130, with an MLD link 132 providing administrative communications.

The RAP MLD 118*a* may determine that the dependent radios are suffering from interference, in stage 402. Here, the interference determiner 202 can determine that one of the channels or both channel interfaces 120*a*, 120*b*, 122*a*, and/or 122*b* are suffering from interference. The candidate radio interference checker 204 can then determine which dependent MLD radios 120 need to have a channel change. For example, the candidate radio interference checker 204 can determine whether the link 128, e.g., from the 5 GHz radio interface, should be changed to a different radio link.

The radio configurer 206 of the RAP MLD 118*a* may detach the Media Access Control (MAC) layer Service Access Point (SAP) 124 and or 126 from the radio suffering from interference, in stage 404. The radio configurer 206 can detach the SAP from the link, e.g., link 128, having interference issues to transfer or bind that MAC SAP to another radio. The radio configurer 206 may then bind the MAC SAP to the other, radio, in stage 406. For example, the link 128, over the 5 GHz radio, may be changed from the RAP 102 to an MAP 104 and the SAP is bound only to link 130.

The RAP 102 may then dynamically send traffic from the RAP 102 to the MAP 104 over the signal MLD link, e.g., link 130, in stage 408. For example, the two channels 128, 130 may be reduced to the sing link 130, and link 128 may see the SAP removed. This change may bound the devices 118 to the other radio 120*b*, 122*b*, for example, the 6 GHz radio 106*b*. This binding may establish a single MLD Link 130 and/or 132 between the two MLD devices 118*a*, 118*b*.

The radio re-router 208, of the RAP 102, may then change the channel on the old radio, e.g., the 5 GHz radio 106*c*, in stage 410. The radio re-router 208 may then change the channel on the radio having interference or may change to a different band, e.g., the 2.4 GHz radio, after establishing a single MLD link 130. Thereinafter, the RAP 102 may then reattach the MAC SAP across both radios, in stage 412. The radio re-router 208 can then reattach the SAP to both radios. The radio re-router 208 can change the channel and reattach the MAC SAP across both radios to reset the sequencing number at the MAC level to avoid any out of order packets. In this way, the radio interface for the MLD devices is dynamically changed between RAP 102 and MAPs 104.

Figure 5:
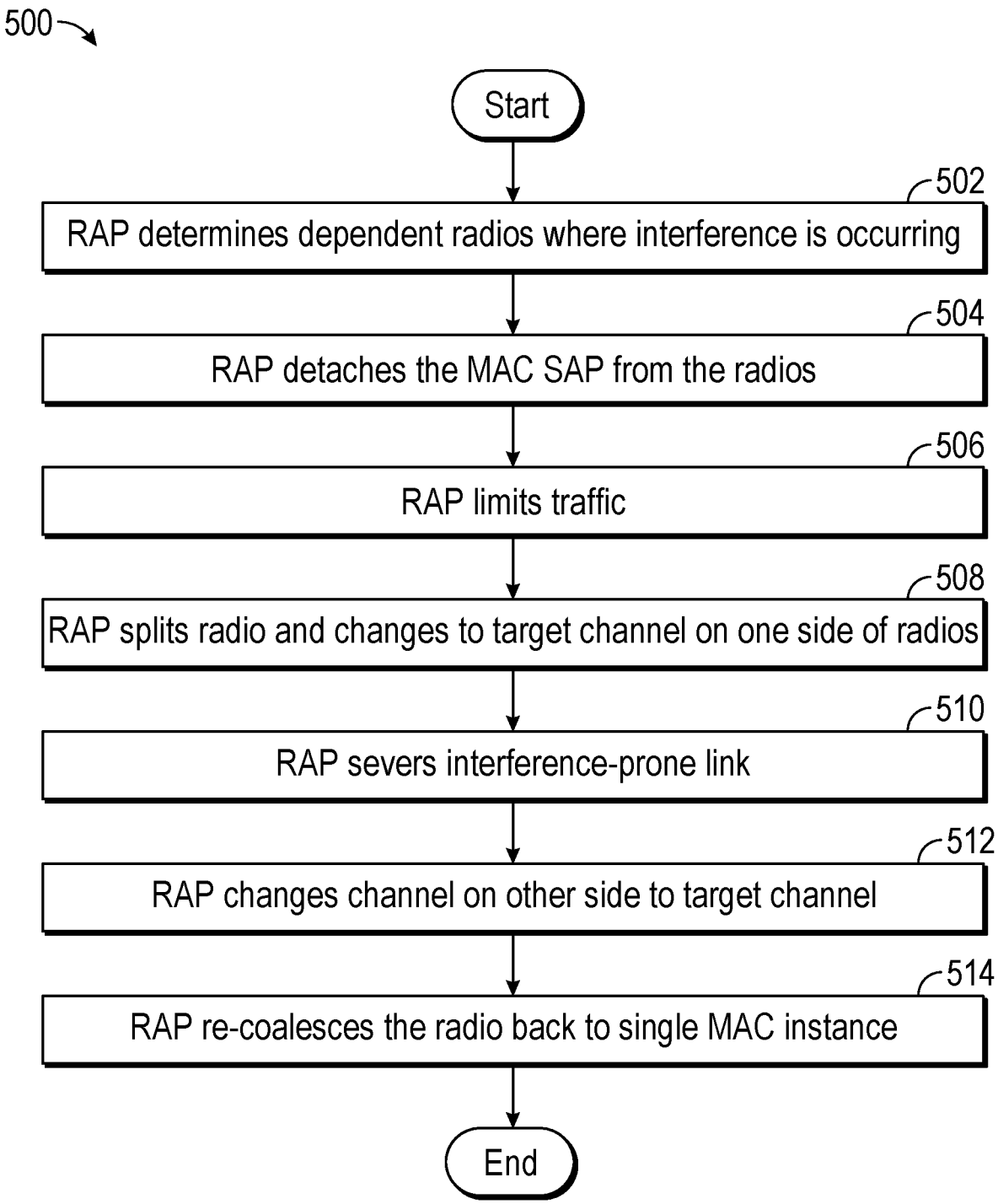
FIG. 5 is another flow chart of a method for changing the frequency band and/or the channel of a wireless mesh backhaul in accordance with aspects of the present disclosure.

An implementation of a method 500 for switching the radio interfaces across AP(s), with at least one AP with a coalesced radio, may be as shown in FIG. 5. The method 500 may be as described in conjunction with FIGS. 1G and 1H. The method 500 can start with a start operation and can end with an end operation. The method 500 can include more or fewer stages or can arrange the order of the stages differently than those shown in FIG. 5. The method 500 can be executed as a set of computer-executable instructions, executed by a computer system or processing component, and be encoded or stored on a storage medium. Further, the method 500 can be executed by a gate or other hardware device or component in an ASIC, a FPGA, a SOC, or other type of hardware device. Hereinafter, the method 500 shall be explained with reference to the systems, components, modules, software, data structures, etc. described herein.

The RAP 102 may determine that dependent radio interference is occurring, in stage 502. The interference determiner 202 may determine that one or more radio interfaces is suffering from interference or other issues. The interference determination may then be sent to the candidate radio interference checker 204 and/or the radio configurer 206 to determine whether a channel should be changed to a new radio.

The interference determiner 202 can determine the channel, as shown in stage #0, 136, of FIG. 1G, suffers from interference and may need to be switched between radios 148*a* and 148*b* on the two separate APs. The radio configurer 206 may then go through a process to decouple the coalesced radios.

For example, the RAP 102, and or MAP 104, may detach the MAC SAP from the radios 148, in stage 504. The radio configurer 206 can detach the MAC SAP from the coalesced radios of the MAP 104 and/or RAP 102. Then, the radio configurer 206 may then limit traffic from the RAP 102 or to the RAP 102 from the MAP 104 to a single link 151, in stage 506. Traffic is limited to first decouple or change the coalesced radios.

The RAP 102 may then split the coalesced radios and change to the target channel on one side of the radios, in stage 508. For example, the coalesced radio interface 216 may change the coalesced radios, as shown in stage #1 138 of FIG. 1G. Here, the channel 151 is now only between one 4×4 radio, on the RAP 102, and the same 4×4 radio on the MAP. Thus, the coalesced radios are split and decoupled as shown with the APs 150*a* and 150*b*. The configuration of the radios, at each AP, has changed into two different radios, e.g., two 5 GHz radios. Thereinafter, the radio re-router 208 can establish link 152*a* between the second set of 4×4 radios as shown in stage #2, 140. At this point, the APs can pass data between two different links 151 and 152.

The radio sever 210 of the RAP 102 may then sever the interference-problematic link, in stage 510. The radio sever 210 may discontinue the link 151 between the two APs as is shown in stage #3 142. Thus, only the second link 152*a* continues to communicate data between the two APs on a single 4×4 radio antenna array. In some implementations, then, the radio re-router 208 can then change the channel on the other side of the radio link so that the other 5 GHz radio not currently passing traffic is on the same target channel 152A, in stage 512. This change may be done during stage #4 144. In this way, now both portions of the split radios are on the same channel.

The coalesced radio interface 216 may then re-coalesce the radios back to a single MAC instance, in stage 514. The coalesced radio interface 216 can re-coalesce the radios as shown in stage #5 146 of FIG. 1G. Then, the coalesced radios may pass data along the single link 154 that was changed on the separate separated radios. In this way, the coalesced radios can change channels during the stages 134-146, as shown in FIG. 1G.

In another implementation, only one side of the two APs may have a coalesced radio, as may be as shown in FIG. 1H. Here, the changes in the radio links shown in stages 134-146 of FIG. 1H may be done similarly, as described above. For example, in a first stage #1 136, the first AP may have coalesced radios 140*a* but not at a second AP 104*b*. Data may be transmitted from the coalesced radio 148*a* to a single radio 148*b*. In these situations, the radios 148*a* are split, as shown in radio configuration 150*a* and 150*b*, as shown in stage #1 138.

The channel 151 is maintained between one of the split radios 150*a* and the second radio 150*b*. Thereinafter, the second channel 152*a* can be established between the second radios while the first channel 151 is maintained between the second set of radios. The traffic can then be sent out to the second link 152*a*, and the first link 151 can be severed, as shown in stage #3 142. Then, the second radios can be changed to the same channel 152, while the radios are still split as is shown in stage #4 144. Thereinafter, the radios on one or both of the devices may be re-coalesced into the single radio using a single channel 154 as shown in stage #5 146.

Figure 6A:
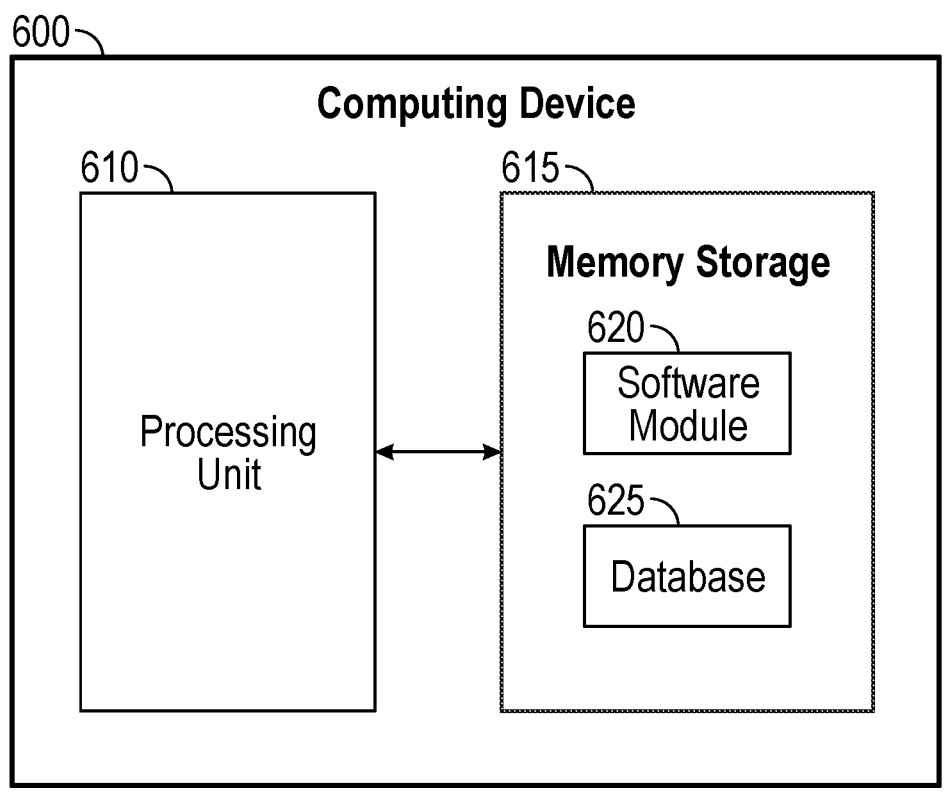
FIG. 6A is a block diagram of a computing device in accordance with aspects of the present disclosure.

FIG. 6A shows computing device 600. As shown in FIG. 6A, computing device 600 may include a processing unit 610 and a memory unit 615. Memory unit 615 may include a software module 620 and a database 625. While executing on processing unit 610, software module 620 may perform, for example, processes for providing radio interface re-routing as described above with respect to FIGS. 3, 4, and 5. Computing device 600, for example, may provide an operating environment for the controller 103, the APs 102/104, or the other devices, however, the controller 103, APs 102/104, and other devices may operate in other environments and are not limited to computing device 600.

Computing device 600 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Figure 6B:
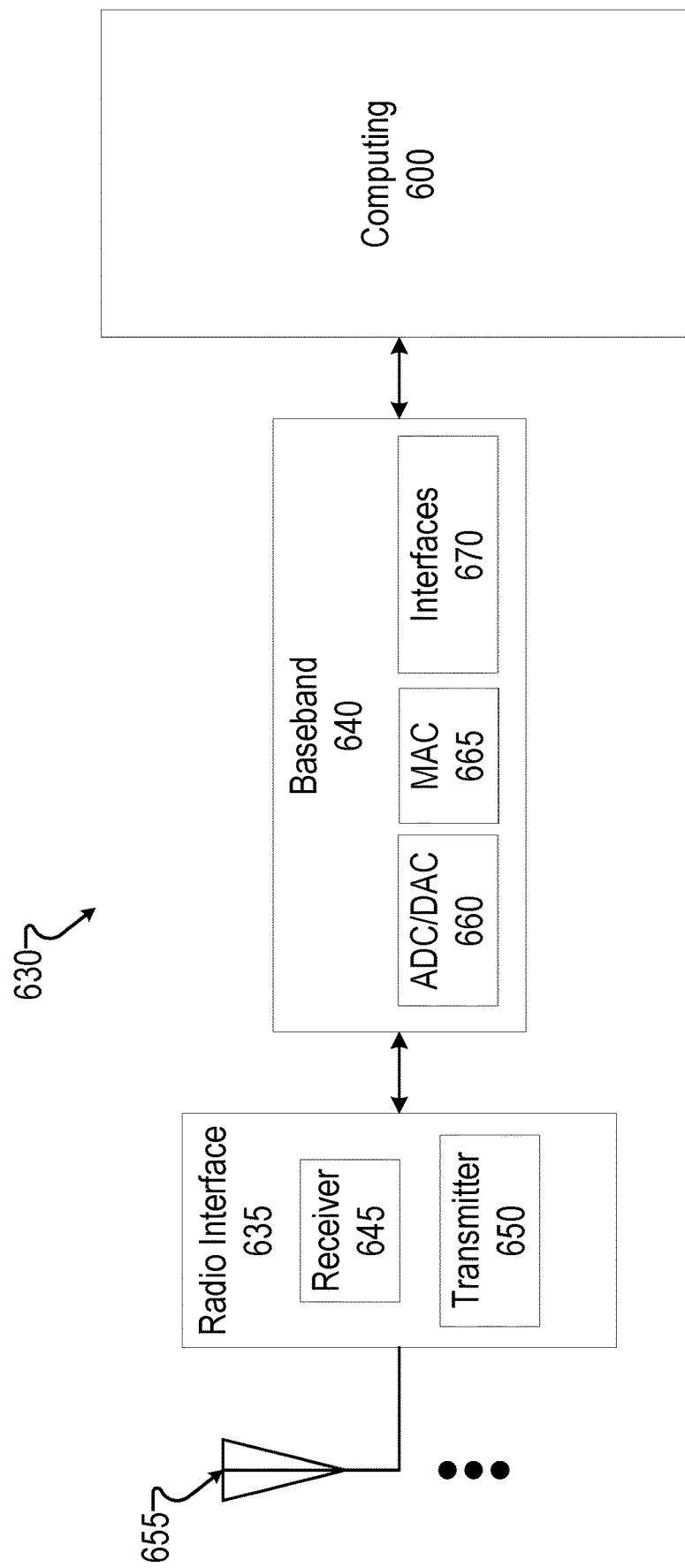
FIG. 6B is a block diagram of an AP or other networking device in accordance with aspects of the present disclosure.

FIG. 6B illustrates an implementation of a communications device 630 that may implement one or more of APs 102/104, 112, 114, and/or 118, controllers 103, and/or client devices of FIGS. 1A through 1H. In various implementations, device 630 may comprise a logic circuit. The logic circuit may include physical circuits to perform operations described for one or more of APs 102/104, 112, 114, and/or 118, controllers 103, and/or client devices of FIGS. 1A through 1H, for example. As shown in FIG. 6B, device 630 may include one or more of, but is not limited to, a radio interface 635, baseband circuitry 640, and/or computing platform 600.

The device 630 may implement some or all of the structures and/or operations for APs 102/104, 112, 114, and/or 118, controllers 103, and/or client devices of FIGS. 1A through 1H, storage medium, and logic circuit in a single computing entity, such as entirely within a single device. Alternatively, the device 630 may distribute portions of the structure and/or operations using a distributed system architecture, such as a client-server architecture, a peer-to-peer architecture, a master-slave architecture, etc.

A radio interface 635, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-error interface or modulation scheme. The radio interface 635 may include, for example, a receiver 645 and/or a transmitter 650. Radio interface 635 may include bias controls, a crystal oscillator, and/or one or more antennas 655. In additional or alternative configurations, the radio interface 635 may use oscillators and/or one or more filters, as desired.

Baseband circuitry 640 may communicate with radio interface 635 to process, receive, and/or transmit signals and may include, for example, an Analog-To-Digital Converter (ADC) for down converting received signals with a Digital-To-Analog Converter (DAC) 660 for up converting signals for transmission. Further, baseband circuitry 640 may include a baseband or PHYsical layer (PHY) processing circuit for the PHY link layer processing of respective receive/transmit signals. Baseband circuitry 640 may include, for example, a Media Access Control (MAC) processing circuit 665 for MAC/data link layer processing. Baseband circuitry 640 may include a memory controller for communicating with MAC processing circuit 665 and/or a computing platform 600, for example, via one or more interfaces 670.

In some configurations, PHY processing circuit may include a frame construction and/or detection module, in combination with additional circuitry such as a buffer memory, to construct and/or deconstruct communication frames. Alternatively or in addition, MAC processing circuit 665 may share processing for certain of these functions or perform these processes independent of PHY processing circuit. In some configurations, MAC and PHY processing may be integrated into a single circuit.

The methods and systems here have distinct advantages and allow for managing interference issues on a backhaul of a mesh network. The APs in the network can switch to redundant radio, having a different frequency band, when interference requires. However, the old link is not severed or torn down until the switch to the new radio link is complete. In this way, the switch does not cause issues with the client service.

Example of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, example of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an Erasable Programmable Read-Only Memory (EPROM or Flash memory), an optical fiber, and a portable Compact Disc Read-Only Memory (CD-ROM). Node that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain example of the disclosure have been described, other example may exist. Furthermore, although example of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, example of the disclosure may be practiced in an electrical circuit comprising discrete electronic elements, packaged or integrated electronic chips containing logic gates, a circuit utilizing a microprocessor, or on a single chip containing electronic elements or microprocessors. Example of the disclosure may also be practiced using other technologies capable of performing logical operations such as, for example, AND, OR, and NOT, including but not limited to, mechanical, optical, fluidic, and quantum technologies. In addition, example of the disclosure may be practiced within a general purpose computer or in any other circuits or systems.

Example of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via an SOC, the functionality described herein with respect to example of the disclosure, may be performed via application-specific logic integrated with other components of computing device 600 on the single integrated circuit (chip).

Example of the present disclosure, for example, are described above with reference to block diagrams and/or operational illustrations of methods, systems, and computer program products according to example of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for example of the disclosure.

What is claimed is:

1. A Multicast Listener Discovery (MLD) device comprising:
   a memory storage; and
   a processing unit coupled to the memory storage, wherein the processing unit is operative to:
      establish a first channel of a first radio link and a second channel of a second radio link with a second Access Point (AP);
      detect interference on the first channel of the first radio link with the second AP:
      check availability of a redundant radio at the second AP;
      establish a new radio link with the redundant radio at the second AP wherein establishing the new radio link with the redundant radio at the second AP comprises detaching a Media Access Control (MAC) Service Access Point (SAP) from the first channel;
      reroute data traffic over the new radio link to the second AP;
      after establishing the new radio link, sever the first channel with the second AP; and
      change the first channel and reattach the MAC SAP across the first radio link and the new radio link over the redundant radio.

2. The MLD device of claim 1, wherein the processing unit binds the MAC SAP to the new radio link over the redundant radio.

3. The MLD device of claim 1, wherein the processing unit, after the new radio link is established, sends data traffic only over the new radio link.

4. A non-transitory computer-readable medium that stores a set of instructions which when executed perform a method executed by the set of instructions comprising:
   detecting, at a first Access Point (AP) in a network, inference on a channel with a second AP, wherein the first AP or the second AP communicates with a coalesced radio;
   splitting the coalesced radio into a first radio and a second radio;
   checking, by the first AP, availability a redundant radio at the second AP;
   establishing, by the first AP, a new radio link between the first radio and the redundant radio at the second AP;
   rerouting, by the first AP, data traffic over the new radio link to the second AP;
   after establishing the new radio link, severing the channel with the second AP;
   changing to the new radio link on the second radio;
   re-coalescing the first radio and the second radio;
   detaching a Media Access Control (MAC) Service Access Point (SAP) from the coalesced radio; and
   before rerouting the data traffic over the new radio link, limiting data traffic to a single link between the first radio and the redundant radio of the second AP.

5. The non-transitory computer-readable medium of claim 4, wherein only the first AP has the coalesced radio.

6. A method comprising:
   establishing a first channel of a first radio link and a second channel of a second radio link with a second Access Point (AP) AP;
   detecting inference interference on the first channel of the first radio link with the second AP;
   checking availability of a redundant radio at the second AP;
   establishing a new radio link with the redundant radio at the second AP wherein establishing the new radio link with the redundant radio at the second AP comprises detaching a Media Access Control (MAC) Service Access Point (SAP) from the first channel;
   rerouting data traffic over the new radio link to the second AP;
   after establishing the new radio link, severing the first channel with the second AP; and
   changing the first channel and reattach the MAC SAP across the first radio link and the new radio link over the redundant radio.

7. The method of claim 6, further comprising binding the MAC SAP to the new radio link over the redundant radio.

8. The method claim 6, further comprising, after the new radio link is established, sending data traffic only over the new radio link.

* * * * *